W. L. KANN.
GLASS GRINDING OR POLISHING MACHINE.
APPLICATION FILED JULY 17, 1911.
1,071,751.
Patented Sept. 2, 1913.
4 SHEETS—SHEET 1.
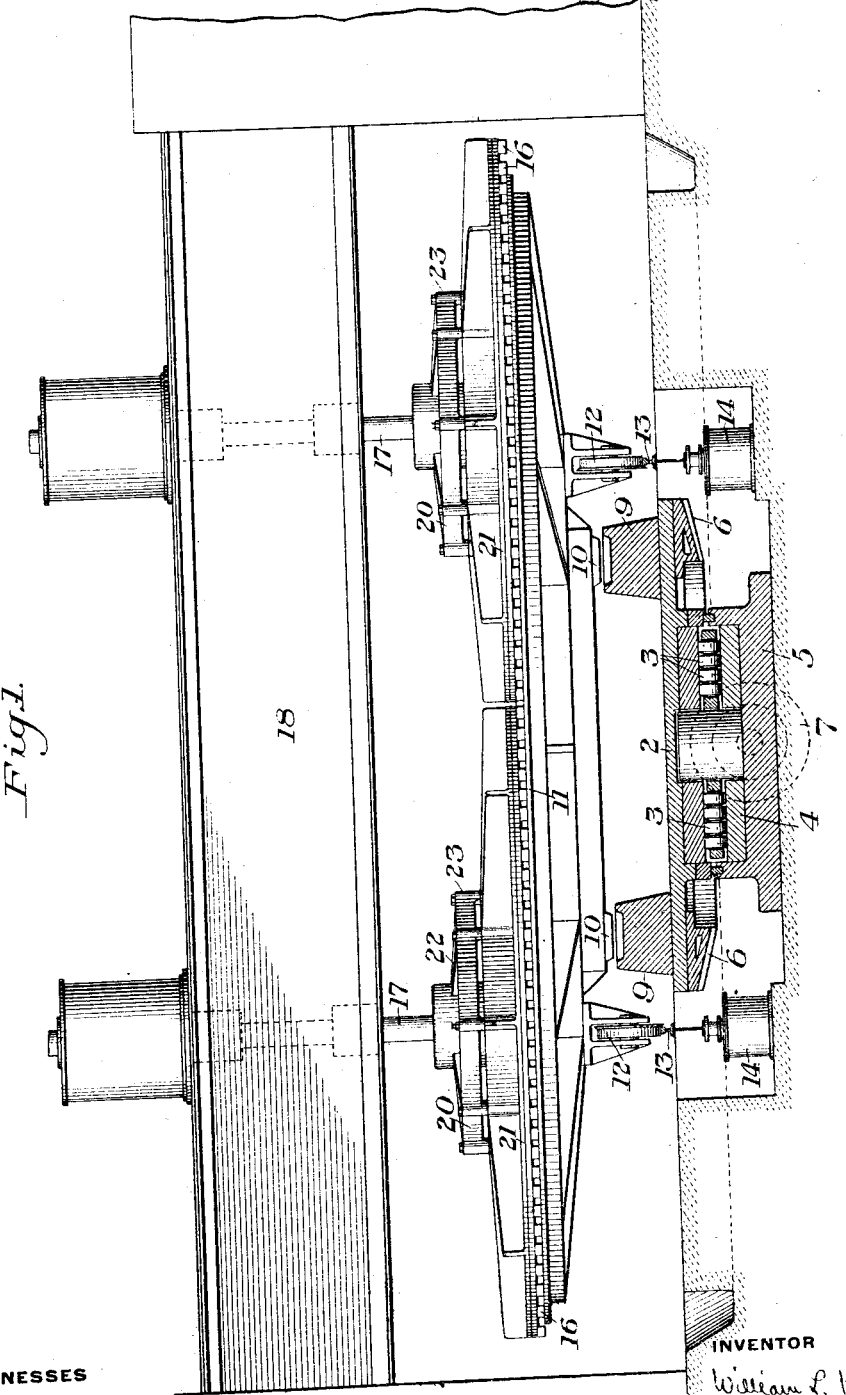

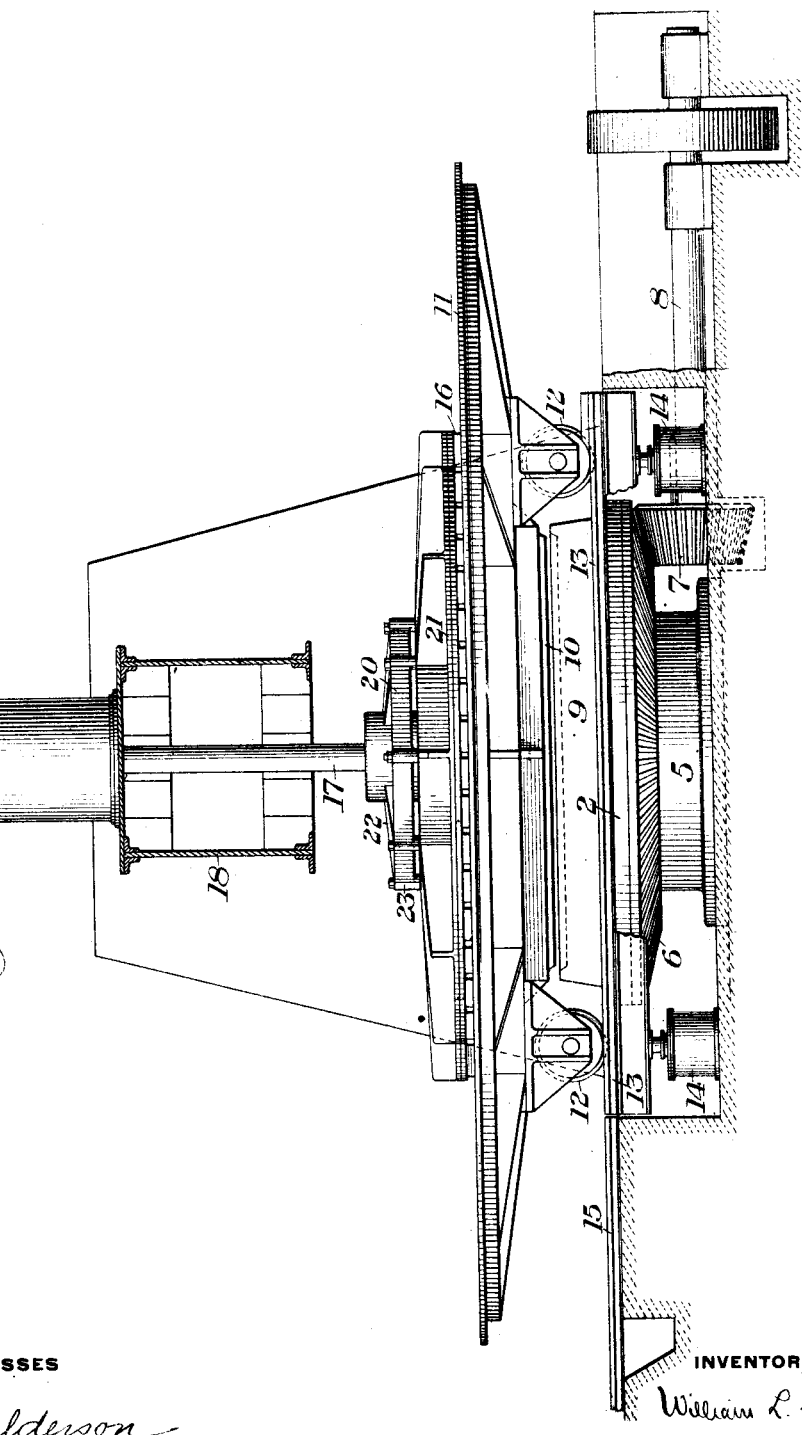

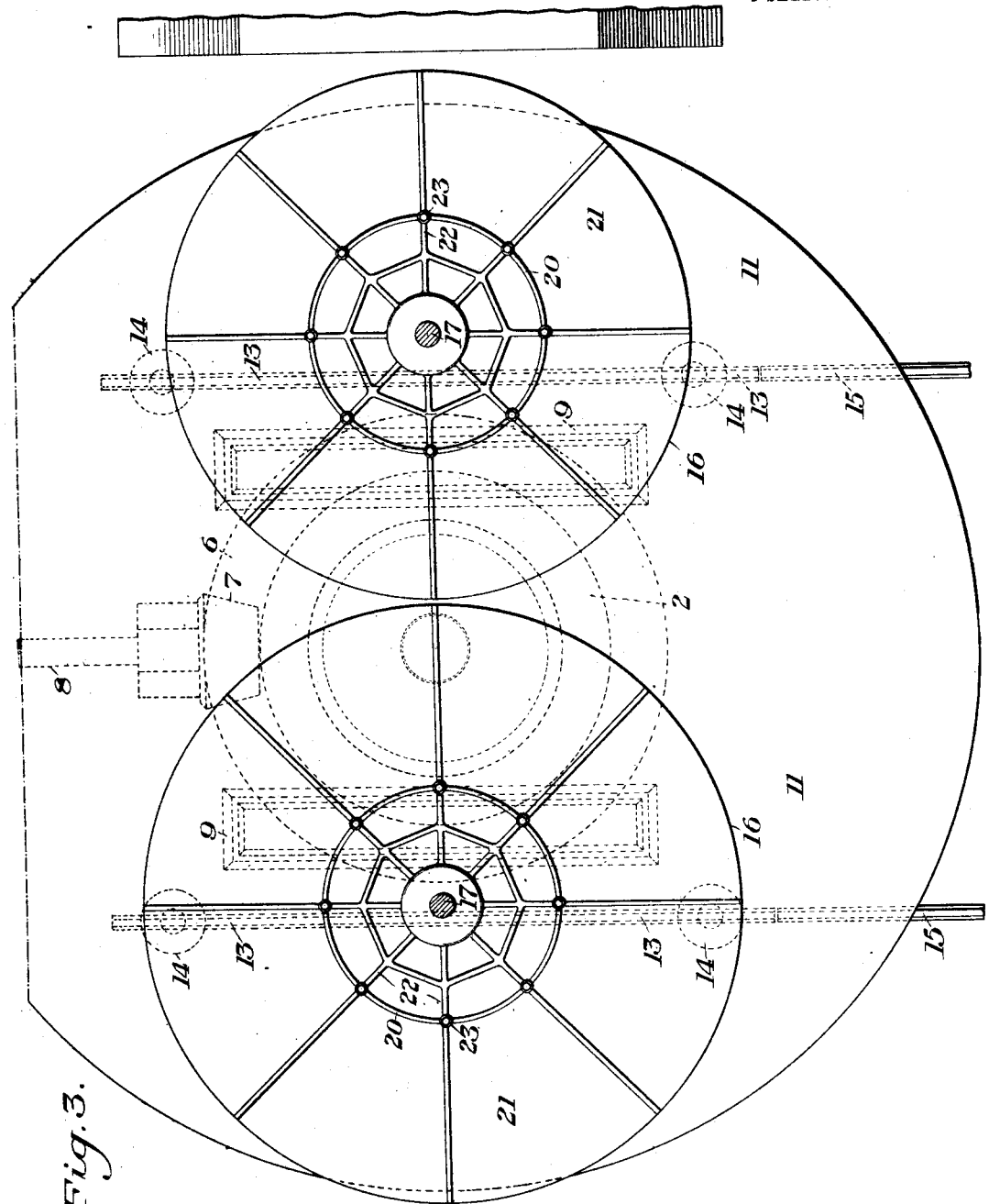

W. L. KANN.
GLASS GRINDING OR POLISHING MACHINE.
APPLICATION FILED JULY 17, 1911.
1,071,751.
Patented Sept. 2, 1913.
4 SHEETS—SHEET 4.
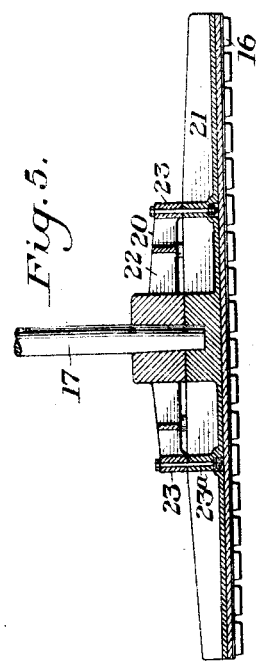
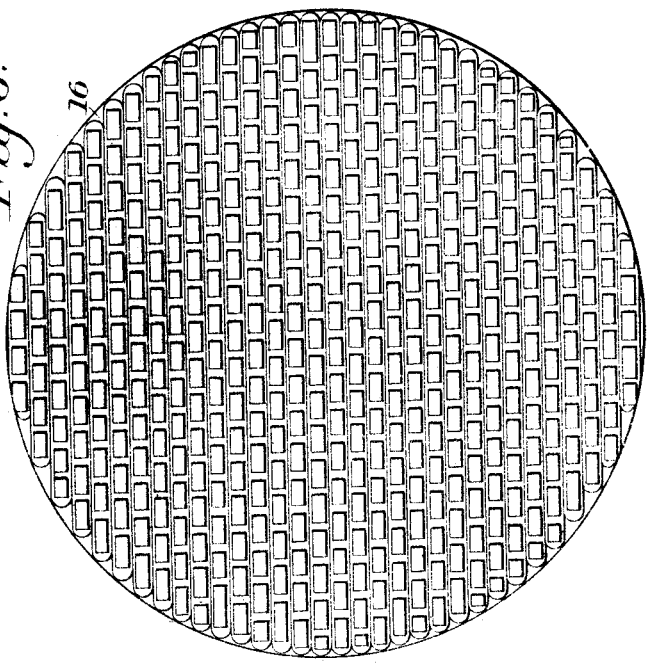
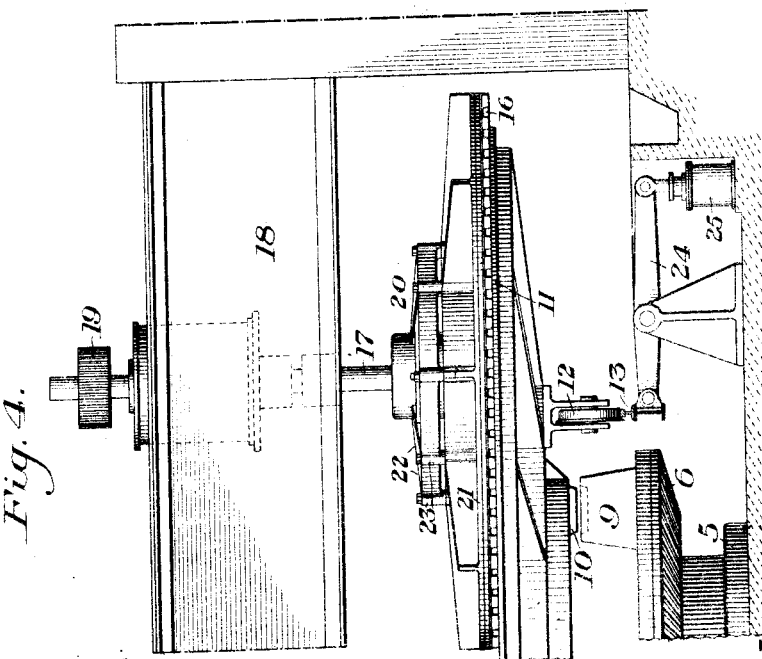
WITNESSES
INVENTOR

UNITED STATES PATENT OFFICE.

WILLIAM L. KANN, OF PITTSBURGH, PENNSYLVANIA.

GLASS GRINDING OR POLISHING MACHINE.

1,071,751.  Specification of Letters Patent.  Patented Sept. 2, 1913.

Application filed July 17, 1911. Serial No. 638,906.

*To all whom it may concern:*

Be it known that I, WILLIAM L. KANN, a resident of Pittsburgh, in the county of Allegheny and State of Pennsylvania, have invented a new and useful Improvement in Glass Grinding or Polishing Machines, of which the following is a full, clear, and exact description, reference being had to the accompanying drawings, forming part of this specification, in which—

Figure 1 is a sectional side elevation of one form of glass-grinding machine constructed in accordance with my invention; Fig. 2 is a sectional end elevation; Fig. 3 is a sectional plan view; Fig. 4 is a side elevation partly broken away, showing a modification of the rotary base; and Figs. 5 and 6 are detail views of one of the grinding disks.

My invention relates to rotary tables employed for grinding and polishing glass, and is designed to give a simple, strong and efficient device of this character which will reduce labor and power consumed, and will provide a flat, level support for the glass in correct relation to the grinders or polishers.

To that end, the invention consists in providing a wheeled table with which coact track rails at the sides of the rotary base, arranged to be raised and lowered, the table being lowered on to the supports on the rotating base which are inside of the wheels of the table, or near the center of rotation. If it is attempted to use annular ball bearings removed from the center of rotation and near the outer edge of the rotating support, I have found in practice that it is difficult to properly manufacture and maintain such ball bearings on account of the large diameter of the ball races, the size of the balls, etc. In practice, the balls are liable to form pits in the races and also to crack or break. Furthermore, if the table is supported on the rotary base by means of the wheels resting on tracks on the said base, the wheeled bearings are liable to become worn so as to destroy the proper level of the glass-supporting table. If the wheels are loose on the spindles, the wheel bearing on the spindle will wear, and if the wheels are fast to the spindles, the bearings for the spindles will wear and thereby the proper positioning of the table is impaired. By supporting the table on its rotatable base instead of its wheels, I am enabled to use a smaller base and at the same time provide for proper supporting of the overhanging portions of the glass-supporting table, especially in combination with an annular row or rows of antifriction bearings for the base surrounding its center of movement. These annular bearings will keep the base substantially level, and thereby insure the proper positioning of the glass-carrying table on the supports independent of and inside the wheels.

My invention also includes a specific improvement in the supporting or attaching of the grinder disk.

In the drawings, 2 represents a rotary base mounted on annular rows of antifriction rollers 3, carried in a suitable bearing 4 on the base plate 5. This base is provided with an annular beveled gear rack 6, with which intermeshes a bevel pinion 7, on a driving shaft 8. The base is provided with supporting blocks 9, 9, which may have a tapered tongue-and-groove connection with the depending supports 10, of the glass-carrying table 11, if desired, in order to more accurately center and lock the two tables together. The supports may, however, simply rest upon each other, as the weight of the glass-carrying table will normally hold the parts in proper position.

The glass-carrying table 11 is provided with four wheels 12, adapted to run on track rails 13, each rail being mounted on hydraulic cylinders 14, the rails and cylinders being positioned at opposite sides of the base. With these rail sections 13 register the fixed rails 15, over which the carrying table 11 carrying the glass may be moved from the place where the glass is applied to it. In some instances it may be preferable to mount the rails on levers 24, actuated by cylinders 25, as shown in Fig. 4.

In the use of the apparatus shown in Figs. 1 to 3, the removable glass-carrying table resting on its rails, is brought into position over the rails 15, so that it will register with the rail sections 13. The table is then run on to the sections 13 while the hydraulic cylinders 14 hold said rails elevated in registering position. The glass-carrying table then being brought centrally over the rotary base, the pressure is exhausted from the hydraulic cylinders, allowing the glass-carrying table to move downwardly and rest upon the rotary base with which it may be interlocked, as above described. Power then being applied through the bevel gear connection, the table is rotated to give the proper action for the grinding or polishing disks. The levels of the supports of the base and table must, of course, be designed relative to the stroke of the hydraulic pistons so that the rail sections 13 will drop away when the tables are in engagement and will lift the glass-carrying table and bring its wheels into register with the track sections at the side.

With this apparatus, I may provide a grinding or polishing machine having a top drive, as shown in Fig. 4. Thus, in the form shown in the figure, the grinding disks 16 are supported on two spindles 17, carried in the horizontal frame 18 and having actuating gears 19 at their upper ends.

With this table, I preferably employ a grinding disk, shown in detail in Figs. 5 and 6. As shown in these figures, the disk is divided horizontally into two portions 20 and 21, the upper portion 20 having radial ribs 22, provided with hollow bosses 23, which register with similar bosses 23ª, of the section 21, through which bolts extend which secure the lower section in place. The grinders may be made in the form of strips with bosses, which are secured to a wooden base fastened to the lower section of the plate.

The advantages of my invention result mainly from the supporting of the wheeled removable glass-carrying table on the rotary base inside of its wheels and independent thereof. I thus avoid the difficulties incident to supporting the glass-carrying table on wheels upon the base, and can reduce the size of the base by the use of the annular antifriction bearings which are preferably of the roller type, though other forms of antifriction elements or bearings may be employed. The usual central driving and supporting shaft of such machines may be done away with by this invention, and the excessive wear and strains thereof avoided, as well as the many moving parts in operation, and the expense of foundations and excessive excavations. A further advantage is in the very great reduction in power required in the operation of the machine. The central shaft may, however, be added to my invention, without departing from it.

The two-part grinding disk gives facility for removal of the lower part and replacing of the grinder bars when they are worn out.

Many changes may be made in the form and arrangement of the tables, wheels, grinding or polishing attachments, etc., without departing from my invention.

I claim:

A glass grinding or polishing machine, having a stationary base provided with an annular row or rows of antifriction bearings, a rotary base carried on said bearings, a removable glass carrying table having wheels arranged to allow its being moved on and off the rotary base, the rotary base and supporting base being within the wheel base of the table, and supports on the rotary base for the table within the table wheel base, substantially as described.

In testimony whereof, I have hereunto set my hand.

WILLIAM L. KANN.

Witnesses:
GEO. B. BLEMING,
H. M. CORWIN.